(12) United States Patent
Artzi et al.

(10) Patent No.: US 9,043,761 B2
(45) Date of Patent: May 26, 2015

(54) FAULT LOCALIZATION USING CONDITION MODELING AND RETURN VALUE MODELING

(75) Inventors: Shay Artzi, Brookline, MA (US); Julian Dolby, Bronx, NY (US); Marco Pistoia, Amawalk, NY (US); Frank Tip, Ridgewood, NJ (US)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 12/873,843

(22) Filed: Sep. 1, 2010

(65) Prior Publication Data

US 2012/0054553 A1    Mar. 1, 2012

(51) Int. Cl.
G06F 9/44    (2006.01)
G06F 11/36    (2006.01)

(52) U.S. Cl.
CPC ........ *G06F 11/3688* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 5,048,018 A * | 9/1991 | Bernstein et al. | 717/131 |
| 5,351,247 A * | 9/1994 | Dow et al. | 714/26 |
| 5,422,890 A * | 6/1995 | Klingsporn et al. | 714/723 |
| 5,673,387 A * | 9/1997 | Chen et al. | 714/38.1 |
| 6,012,152 A * | 1/2000 | Douik et al. | 714/26 |
| 6,167,545 A * | 12/2000 | Statovici et al. | 714/724 |
| 6,249,755 B1 * | 6/2001 | Yemini et al. | 702/183 |
| 6,367,041 B1 * | 4/2002 | Statovici et al. | 714/724 |
| 6,550,024 B1 * | 4/2003 | Pagurek et al. | 714/47.2 |
| 6,618,682 B2 * | 9/2003 | Bulaga et al. | 702/84 |
| 6,725,399 B1 * | 4/2004 | Bowman | 714/38.14 |
| 7,039,902 B2 * | 5/2006 | Kuzmin et al. | 717/126 |
| 7,120,559 B1 * | 10/2006 | Williams et al. | 702/185 |
| 7,502,971 B2 * | 3/2009 | Cohen et al. | 714/45 |
| 7,530,054 B2 * | 5/2009 | Reimer et al. | 717/125 |
| 7,533,070 B2 * | 5/2009 | Guralnik et al. | 706/16 |
| 7,813,822 B1 * | 10/2010 | Hoffberg | 700/94 |
| 8,195,983 B2 * | 6/2012 | Celeskey et al. | 714/38.1 |
| 8,234,522 B2 * | 7/2012 | Baker et al. | 714/26 |
| 8,453,125 B2 * | 5/2013 | Artzi et al. | 717/131 |
| 8,578,342 B2 * | 11/2013 | Artzi et al. | 717/131 |
| 2002/0046397 A1 * | 4/2002 | Schmitt et al. | 717/125 |
| 2002/0155628 A1 * | 10/2002 | Bulaga et al. | 438/14 |
| 2004/0064806 A1 * | 4/2004 | Johnston-Watt et al. | 717/124 |
| 2004/0078683 A1 * | 4/2004 | Buia et al. | 714/37 |
| 2004/0230872 A1 * | 11/2004 | Mullally et al. | 714/38 |
| 2005/0021293 A1 * | 1/2005 | Elbel et al. | 702/183 |
| 2005/0060317 A1 * | 3/2005 | Lott et al. | 707/10 |

(Continued)

OTHER PUBLICATIONS

Shay Artzi et al. "Practical Fault Localization for Dynamic Web Applications", ACM, 2010, <http://www.franktip.org/pubs/icse2010.pdf>, pp. 1-10.*

(Continued)

*Primary Examiner* — Thuy Dao
*Assistant Examiner* — Samuel Hayim
(74) *Attorney, Agent, or Firm* — Fleit Gibbons Gutman Bongini & Bianco PL; Jon A. Gibbons

(57) ABSTRACT

Disclosed is a novel computer implemented system, on demand service, computer program product and a method that leverages combined concrete and symbolic execution and several fault-localization techniques to automatically detects failures and localizes faults in PHP Hypertext Preprocessor ("PHP") Web applications.

16 Claims, 9 Drawing Sheets

(56) References Cited

U.S. PATENT DOCUMENTS

| | | |
|---|---|---|
| 2006/0149990 A1* | 7/2006 | S. et al. .......................... 714/1 |
| 2007/0016894 A1* | 1/2007 | Sreedhar ...................... 717/131 |
| 2007/0028219 A1* | 2/2007 | Miller et al. ................. 717/124 |
| 2007/0028220 A1* | 2/2007 | Miller et al. ................. 717/124 |
| 2007/0113135 A1* | 5/2007 | Rajski et al. ................. 714/738 |
| 2007/0282777 A1* | 12/2007 | Guralnik et al. ............... 706/48 |
| 2008/0115029 A1* | 5/2008 | Kusko et al. ................. 714/742 |
| 2008/0276228 A1* | 11/2008 | Sreedhar ...................... 717/131 |
| 2009/0063387 A1* | 3/2009 | Beaty et al. ..................... 706/50 |
| 2009/0113399 A1* | 4/2009 | Tzoref et al. ................. 717/130 |
| 2010/0088546 A1* | 4/2010 | Chilimbi et al. ............... 714/26 |
| 2010/0100871 A1* | 4/2010 | Celeskey et al. ............. 717/124 |
| 2011/0016356 A1* | 1/2011 | Artzi et al. ..................... 714/38 |
| 2011/0016456 A1* | 1/2011 | Artzi et al. ................... 717/131 |
| 2011/0016457 A1* | 1/2011 | Artzi et al. ................... 717/131 |
| 2011/0030061 A1* | 2/2011 | Artzi et al. ..................... 726/25 |
| 2011/0083123 A1* | 4/2011 | Lou et al. ..................... 717/125 |

OTHER PUBLICATIONS

Dan Hao et al., "Towards Interactive Fault Localization Using Test Information", IEEE, 2006, <http://ieeexplore.ieee.org/stamp/stamp.jsp?tp=&arnumber=4137428>, pp. 1-8.*
Nicholas DiGiuseppe et al., "On the Influence of Multiple Faults on Coverage-Based Fault Localization", ACM, 2011, <http://delivery.acm.org/10.1145/2010000/2001446/p210-digiuseppe.pdf>, pp. 1-11.*
Abreu, et al., "An evaluation of similarity coefficients for software fault localization." In PRDC 2006, pp. 39-46, 2006.
Agrawal, et al., "Fault localization using execution slices and dataflow tests." In ISSRE, Toulouse, France, 1995.
Artzi, et al., "Finding bugs in dynamic web applications." In ISSTA, pp. 261-272, 2008.
Artzi, et al., "Finding bugs in web applications using dynamic test generation and explicate model checking." IEEE Transactions on Software Engineering, 2010.
Cadar, et al., "EXE: automatically generating inputs of death." In CCS, 2006.
Chilimbi, et al., "Effective statistical debugging via efficient path profiling." In ICSE, 2009.
Cleve, et al., "Locating causes of program failures." In ICSE, pp. 342-351, May 2005.
Dallmeier, et al., "Lightweight defect localization for java." In ECOOP, pp. 528-550, 2005.
Godefroid, et al., "Directed automated random testing." In PLDI, 2005.
Godefroid, et al., "Automated whitebox fuzz testing." In NDSS, 2008.
Horwitz, et al., "Interprocedural slicing using dependence graphs." ACM Trans. Program. Lang. Syst., 12(1):26-60, 1990.
Hutchins, et al., "Experiments of the effectiveness of dataflow- and control flow-based test adequacy criteria." In ICSE, pp. 191-200, 1994.
Jeffrey, et al., "Fault localization using value replacement." In ISSTA, pp. 167-178, 2008.
Jones, et al., "Empirical evaluation of the *Tarantula* automatic fault-localization technique." In ASE, pp. 273-282, 2005.
Jones, et al., "Visualization of test information to assist fault localization." In ICSE, pp. 467-477, 2002.
Liblit, et al., "Bug isolation via remote program sampling." In PLDI, pp. 141-154, 2003.
Liblit, et al., "Scalable statistical bug isolation." In PLDI'05, pp. 15-26, 2005.
Liu, et al., "Sober: statistical model-based bug localization." In FSE, pp. 286-295, 2005.
Lyle, et al., "Automatic bug location by program slicing." In ICCEA, pp. 877-883, Beijing (Peking), China, 1987.
Minamide, Y, "Static approximation of dynamically generated Web pages". In WWW, 2005.
Pan, et al., "Heuristics for automatic localization of software faults." Technical Report SERC-TR-116-P, Purdue University, Jul. 1992.
Ren, et al., "Heuristic ranking of java program edits for fault localization." In ISSTA, pp. 239-249, 2007.
Renieris, et al., "Fault localization with nearest neighbor queries." In ASE, pp. 30-39, 2003.
Santelices, et al., "Lightweight fault-localization using multiple coverage types." In ICSE, pp. 56-66, 2009.
Sen, et al., "CUTE: A concolic unit testing engine for C." In FSE, 2005.
Stoerzer, et al., "Finding Failure-inducing Changes in Java Programs Using Change Classification." In FSE, pp. 57-68, Portland, OR, USA, Nov. 7-9, 2006.
Tip, F., "A survey of program slicing techniques." Journal of Programming Languages, 3(3):121-189, 1995.
Wassermann, et al., "Dynamic test input generation for web applications." In ISSTA, 2008.
Yilmaz, et al., "Time will tell: fault localization using time spectra." In ICSE, pp. 81-90, 2008.
Zeller, A., "Isolating cause-effect chains from computer programs." In FSE, pp. 1-10. ACM Press, Nov. 2002.
Zhang, et al., "Locating faults through automated predicate switching." In ICSE, pp. 272-281, 2006.
Zhang, et al., "Capturing propagation of infected program states." In ESEC/FSE, pp. 43-52, 2009.

* cited by examiner

```
1  <HTML>
2   <HEAD><TITLE>Login</TITLE></HEAD>
3   <BODY>
4    <FORM METHOD = "post" NAME = "login" ACTION = "login.php">
5     User Name: <INPUT TYPE = "text" NAME = "user"/><BR>
6     Password: <INPUT TYPE = "password" NAME = "pw"/><BR>
7     <INPUT TYPE = "submit" VALUE = "submit" NAME = "Submit"/>
8    </FORM>
9   </BODY>
10 </HTML>
```

(a) index.php

FIG. 1A

```
1  <?php
2   $userTag = 'user';
3   $pwTag = 'pw';
4   $typeTag = 'type';
5   $topicTag = 'topic';
6   $authTag = 'auth';
7   function check_password($user, $pw) {
8    /* authentication code... */
9   }
10 ?>
```

(b) constants.php

FIG. 1B

```
1  <HTML>
2   <HEAD><TITLE>Topic Selection Page</TITLE></HEAD>
3   <BODY>
4   <?php
5     session_start();
6     require(dirname(__FILE__)./'includes/constants.php');
7     $user = $_REQUEST[$userTag];
8     $pw = $_REQUEST[$pwTag];
9     $_SESSION[$authTag] = false;
10    if (check_password($user, $pw)) {
11  ?>
12      <FORM action="view.php" >
13        Topic: <INPUT TYPE="text" NAME="topic" /><BR>
14        <INPUT TYPE="submit" VALUE="submit" NAME="Submit"
15      </FORM>
16    </BODY>
17  <?php
18      $_SESSION[$userTag] = $user;
19      $_SESSION[$pwTag] = $pw;
20      $_SESSION[$authTag] = true;
21      if ($user == 'admin') {
22        $_SESSION[$typeTag] = 'admin';
23      } else {
24        $_SESSION[$typeTag] = 'regularUser';
25      }
26    }
27  ?>
28  </HTML>
```

(c) login.php

FIG. 1C

```
1  <HTML>
2   <HEAD><TITLE>Topic View</TITLE></HEAD>
3
4   <?php
5     session_start();
6     require(dirname(__FILE__)./'includes/constants.php');
7     print '<BODY>\n';
8     if ($_SESSION[$authTag]) {
9       $type = $_SESSION[$typeTag];
10      $topic = $_REQUEST[$topicTag];
11      if ($type = 'admin') {
12        print "<H1>Administrative ";
13      } else {
14        print "<H1>Normal ";
15      }
16      print "View of topic " . $_REQUEST[$topicTag] . "</H1>\n";
17      if ($type = 'admin') {
18        print "<H2>Administrative Details\n";
19        /* code to print administrative details... */
20      } else {
21        print "<H2>Details</H2>\n";
22        /* code to print normal details... */
23      }
24    }
25    print "</BODY>\n";
26  ?>
27
28  </HTML>
```

(c) login.php

FIG. 1D

```
1 <HTML>
2 <HEAD>Topic View</HEAD>
3 <BODY>
4 <H1>Administrative View of topic A</H1>
...
5 <H2>Administrative Details
...
6 </BODY>
7 </HTML>
```

(a) HTML output

*FIG. 2A*

| HTML line | PHP lines in 1(d) |
|---|---|
| 1 | 1 |
| 2 | 2 |
| 3 | 7 |
| 4 | 12, 16 |
| 5 | 18 |
| 6 | 25 |
| 7 | 28 |

(b) output mapping

*FIG. 2B*

| LINE(S) | EXECUTED BY | $S_{tar}(l)$ | $S_{map}(l)$ | $S_{comb}(l)$ |
|---|---|---|---|---|
| 5,6,7,8,9,10,11 | BOTH | 0.5 | 0.0 | 0.5 |
| 12 | FAILING ONLY | 1.0 | 0.0 | 1.0 |
| 13,14 | PASSING ONLY | 0.0 | 0.0 | 0.0 |
| 16,17 | BOTH | 0.5 | 0.0 | 0.5 |
| 18 | FAILING ONLY | 1.0 | 1.0 | 1.1 |
| 20,21 | PASSING ONLY | 0.0 | 0.0 | 0.0 |
| 25 | BOTH | 0.5 | 1.0 | 0.5 |

FIG. 4

| PROGRAM | VERSION | #FILES | PHP LOC | #DOWNLOADS |
|---|---|---|---|---|
| FAQFORGE | 1.3.2 | 19 | 734 | 14,164 |
| WEBCHESS | 0.9.0 | 24 | 2,226 | 32,352 |
| SCHOOLMATE | 1.5.4 | 63 | 4,263 | 4,466 |
| TIMECLOCK | 1.0.3 | 62 | 13,879 | 23,708 |

FIG. 5

| PROGRAM | TESTS | FAILURES | | | LOCALIZED FAULTS | | |
|---|---|---|---|---|---|---|---|
| | | HTML | EXEC. | total | HTML | EXEC. | total |
| FAQFORGE | 748 | 121 | 9 | 130 | 17 | 3 | 20 |
| WEBCHESS | 503 | 15 | 20 | 35 | 8 | 7 | 15 |
| SCHOOLMATE | 583 | 105 | 42 | 147 | 18 | 2 | 20 |
| TIMECLOCK | 562 | 435 | 3 | 438 | 19 | 1 | 20 |
| TOTAL | 2393 | 676 | 74 | 750 | 62 | 13 | 75 |

FIG. 6

| PROGRAM | TECHNIQUE | # STATEMENTS(%) | 0-1 | 1-10 | 10-20 | 20-30 | 30-40 | 40-50 | 50-60 | 60-70 | 70-80 | 80-90 | 90-100 |
|---|---|---|---|---|---|---|---|---|---|---|---|---|---|
| FAQFORGE | T | 54.6( 7.7) | 15.0 | 50.0 | 35.0 | 0.0 | 0.0 | 0.0 | 0.0 | 0.0 | 0.0 | 0.0 | 0.0 |
| | O | 142.5( 20.1) | 80.0 | 0.0 | 0.0 | 0.0 | 0.0 | 0.0 | 0.0 | 0.0 | 0.0 | 0.0 | 20.0 |
| | T+O | 9.3( 1.3) | 85.0 | 10.0 | 5.0 | 0.0 | 0.0 | 0.0 | 0.0 | 0.0 | 0.0 | 0.0 | 0.0 |
| | TC | 58.4( 8.2) | 10.0 | 55.0 | 35.0 | 0.0 | 0.0 | 0.0 | 0.0 | 0.0 | 0.0 | 0.0 | 0.0 |
| | TC OR O | 79.5( 11.2) | 75.0 | 10.0 | 5.0 | 0.0 | 0.0 | 0.0 | 0.0 | 0.0 | 0.0 | 0.0 | 10.0 |
| | TC+O | 7.4( 1.0) | 85.0 | 5.0 | 10.0 | 0.0 | 0.0 | 0.0 | 0.0 | 0.0 | 0.0 | 0.0 | 0.0 |
| WEBCHESS | T | 203.1( 23.0) | 15.4 | 30.8 | 0.0 | 15.4 | 23.1 | 7.7 | 0.0 | 0.0 | 0.0 | 0.0 | 0.0 |
| | O | 339.8( 38.5) | 61.5 | 0.0 | 0.0 | 0.0 | 0.0 | 0.0 | 0.0 | 0.0 | 0.0 | 0.0 | 38.5 |
| | T+O | 135.8( 15.4) | 69.2 | 0.0 | 7.7 | 7.7 | 7.7 | 7.7 | 0.0 | 0.0 | 0.0 | 0.0 | 0.0 |
| | TC | 139.1( 15.8) | 30.8 | 30.8 | 0.0 | 0.0 | 30.8 | 7.7 | 0.0 | 0.0 | 0.0 | 0.0 | 0.0 |
| | TC OR O | 133.8( 15.2) | 53.8 | 23.1 | 0.0 | 0.0 | 7.7 | 0.0 | 7.7 | 0.0 | 0.0 | 0.0 | 7.7 |
| | TC+O | 61.8( 7.0) | 84.6 | 0.0 | 0.0 | 0.0 | 7.7 | 0.0 | 7.7 | 0.0 | 0.0 | 0.0 | 0.0 |
| SCHOOLMATE | T | 508.5( 18.2) | 25.0 | 45.0 | 10.0 | 0.0 | 0.0 | 0.0 | 0.0 | 10.0 | 0.0 | 5.0 | 5.0 |
| | O | 976.5( 35.0) | 65.0 | 0.0 | 0.0 | 0.0 | 0.0 | 0.0 | 0.0 | 0.0 | 0.0 | 0.0 | 35.0 |
| | T+O | 149.5( 5.4) | 80.0 | 15.0 | 0.0 | 0.0 | 0.0 | 0.0 | 0.0 | 0.0 | 0.0 | 0.0 | 5.0 |
| | TC | 382.8( 13.7) | 30.0 | 45.0 | 10.0 | 0.0 | 0.0 | 0.0 | 0.0 | 10.0 | 0.0 | 0.0 | 5.0 |
| | TC OR O | 837.5( 30.0) | 70.0 | 0.0 | 0.0 | 0.0 | 0.0 | 0.0 | 0.0 | 0.0 | 0.0 | 0.0 | 30.0 |
| | TC+O | 9.1( 0.3) | 90.0 | 10.0 | 0.0 | 0.0 | 0.0 | 0.0 | 0.0 | 0.0 | 0.0 | 0.0 | 0.0 |
| TIMECLOCK | T | 136.5( 3.8) | 15.0 | 85.0 | 0.0 | 0.0 | 0.0 | 0.0 | 0.0 | 0.0 | 0.0 | 0.0 | 0.0 |
| | O | 3600( 100.0) | 90.0 | 0.0 | 0.0 | 0.0 | 0.0 | 0.0 | 0.0 | 0.0 | 0.0 | 0.0 | 10.0 |
| | T+O | 18.3( 0.5) | 90.0 | 10.0 | 0.0 | 0.0 | 0.0 | 0.0 | 0.0 | 0.0 | 0.0 | 0.0 | 0.0 |
| | TC | 138.5( 3.9) | 15.0 | 85.0 | 0.0 | 0.0 | 0.0 | 0.0 | 0.0 | 0.0 | 0.0 | 0.0 | 0.0 |
| | TC OR O | 183.1( 5.1) | 90.0 | 5.0 | 0.0 | 0.0 | 0.0 | 0.0 | 0.0 | 0.0 | 0.0 | 0.0 | 5.0 |
| | TC+O | 18.4( 0.5) | 90.0 | 10.0 | 0.0 | 0.0 | 0.0 | 0.0 | 0.0 | 0.0 | 0.0 | 0.0 | 0.0 |
| AGGREGATED | T | 227.8( 13.2) | 17.8 | 54.8 | 12.3 | 2.7 | 4.1 | 1.4 | 0.0 | 2.7 | 0.0 | 1.4 | 2.7 |
| | O | 465.7( 25.9) | 75.3 | 0.0 | 0.0 | 0.0 | 0.0 | 0.0 | 0.0 | 0.0 | 0.0 | 0.0 | 24.7 |
| | T+O | 72.7( 5.6) | 82.2 | 9.6 | 1.4 | 1.4 | 1.4 | 1.4 | 0.0 | 2.7 | 0.0 | 0.0 | 2.7 |
| | TC | 183.6( 10.4) | 20.5 | 56.2 | 12.3 | 0.0 | 5.5 | 1.4 | 1.4 | 0.0 | 0.0 | 0.0 | 1.4 |
| | TC OR O | 352.2( 15.4) | 74.0 | 8.2 | 1.4 | 0.0 | 1.4 | 1.4 | 1.4 | 2.7 | 0.0 | 0.0 | 13.7 |
| | TC+O | 20.5( 2.2) | 87.7 | 8.2 | 0.0 | 0.0 | 1.4 | 1.4 | 1.4 | 0.0 | 0.0 | 0.0 | 0.0 |

FIG. 7

FAULT LOCALIZATION USING CONDITION MODELING AND RETURN VALUE MODELING

STATEMENT REGARDING FEDERALLY SPONSORED RESEARCH

Not Applicable

BACKGROUND

Web applications are typically written in a combination of several programming languages, such as JavaScript on the client side, and PHP Hypertext Preprocessor ("PHP") with embedded Structured Query Language ("SQL") commands on the server side. Such applications generate structured output in the form of dynamically generated Hyper Text Markup Language ("HTML") pages that may refer to additional scripts to be executed. As with any program, programmers make mistakes and introduce faults, resulting in Web-application crashes and malformed dynamically generated HTML pages. While malformed HTML errors may seem trivial, and indeed many of them are at worst minor annoyances, they have on occasion been known to enable serious attacks such as denial of service.

SUMMARY

The present invention was recently disclosed in a paper entitled "Practical Fault Localization For Dynamic Web Applications." This paper was published at ICSE 2010 May 2010 and the teachings of which is incorporated by reference in its entirety.

Disclosed is a novel computer implemented system, on demand service, computer program product and a method that leverages combined concrete and symbolic execution and several fault-localization techniques to create a uniquely powerful tool that automatically detects failures and localizes faults in PHP Web applications. The fault-localization techniques evaluated combine variations on the Tarantula algorithm with a technique based on maintaining a mapping between executed statements and the fragments of output they produce, mapping of conditional results, and values returned from function calls. These techniques have been implemented in a tool called Apollo, and evaluated by localizing 75 randomly selected faults that were exposed by automatically generated tests in four PHP applications. Our findings indicate that, using our best technique, 87.7% of the faults under consideration are localized to within 1% of all executed statements, which constitutes an almost five-fold improvement over the Tarantula algorithm.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

FIG. 1 is an example PHP web application broken into four parts a, b, c, and d.

FIG. 2 is example HTML produced by the script part d of FIG. 1 along with output mapping constructed during execution and part of the output of WDG Validator on the HTML.

FIG. 4 a table of suspiciousness ratings for lines in the PHP script of FIG. 1(*d*), according to three techniques FIG. 5 is a table of characteristics of subject programs.

FIG. 6 is a table of characteristics of test suites, failures and localized faults in the subject programs.

FIG. 7 is a table of results of fault localization using the different fault localization techniques.

DETAILED DESCRIPTION

Figure 3:
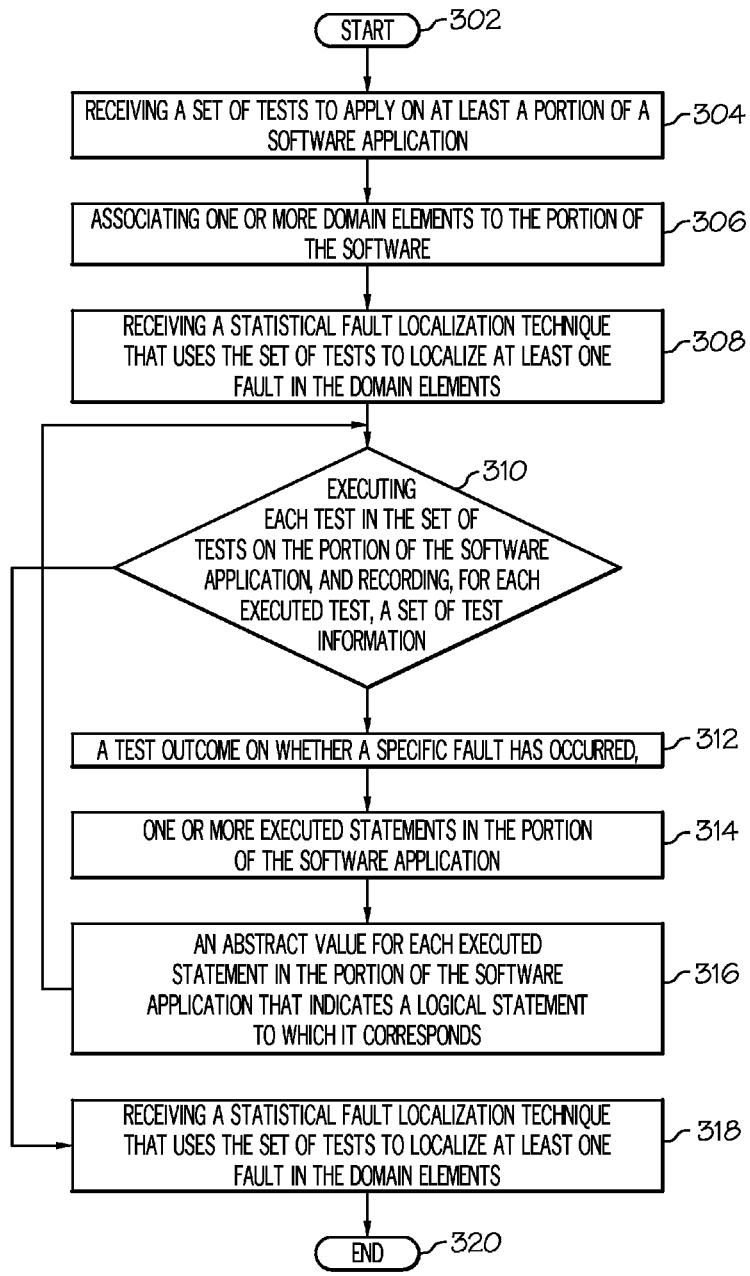
FIG. 3 is an example flow diagram of a computer-implemented method for localizing faults using conditional and return value modeling.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals, refer to like parts through several views.

1. Introduction

In previous work [3, 4], the well-established technique of combined concrete and symbolic execution [9, 25, 5, 10, 28] was adapted to Web applications written in PHP. With this approach, an application is first executed on an empty input, and a path condition is recorded that reflects the application's control-flow predicates that have been executed that depend on input. Then, by changing one of the predicates in the path condition, and solving the resulting condition, new inputs can be obtained, and executing the program on these inputs will result in additional control-flow paths being exercised. In each execution, faults that are observed during the execution are recorded. This process is repeated until sufficient coverage of the statements in the application has been achieved, a sufficient number of faults has been detected, or the time budget is exhausted. Our previous work addresses a number of issues specific to the domain of PHP applications that generate HTML output. In particular: (i) it integrates an HTML validator to check for errors that manifest themselves by the generation of malformed HTML, (ii) it automatically simulates interactive user input, and (iii) it keeps track of the interactive session state that is shared between multiple PHP scripts. The present invention implements these techniques in a tool called Apollo. In previous experiments on 6 open-source PHP applications, Apollo found a total of 673 faults [4].

A problem not addressed by our previous work is that it fails to pinpoint the specific Web-application instructions that cause execution errors or the generation of malformed HTML code. Without that information, correcting these types of issues can be very difficult. This invention addresses the problem of determining where in the source code changes need to be made in order to fix the detected failures. This task is commonly referred to as fault localization, and has been studied extensively in the literature [30, 15, 23, 16, 7, 14]. The present invention uses combined concrete and symbolic execution to obtain passing and failing runs in order to overcome the limitation of many existing fault-localization techniques that a test suite with passing and failing runs be available upfront. The fault-localization techniques explored in this invention combine variations on the Tarantula algorithm by Jones et al. [15, 14] with the use of an output mapping.

The first part of the combined approach is an existing fault localization based on statistical analysis of failing and passing tests such as the Tarantula algorithm by Jones, et al. [15, 14], which predicts statements that are likely to be responsible for failures. It does so by computing, for each statement, the percentages of passing and failing tests that execute that statement. From this, a suspiciousness rating is computed for each executed statement. Programmers are encouraged to examine the statements in order of decreasing suspiciousness. This has proved to be quite effective in experiments with the Siemens suite [12], consisting of versions of small C programs into which artificial faults have been seeded [14]. Two variations on the basic fault localization approach, which we consider is an enhanced domain for conditional statements, which enables the localization of errors more accurately due to missing branches in conditional statements, and return values which enables the localization of errors due to incorrect use of values returned from function calls Another aspect of the present invention is the use of an output mapping from statements in the program to the fragments of output they produce. This mapping—when combined with the report of the HTML validator, which indicates the parts of the program output that are incorrect—provides an additional source of information about possible fault locations, and is used to fine-tune the suspiciousness ratings provided by Tarantula.

Several fault-localization techniques have been implemented that combine variations on Tarantula with the use of the output mapping in Apollo, making Apollo a fully automated tool for failure detection and fault localization for Web applications written in PHP. Next Apollo's ability to localize 75 randomly selected faults that were exposed by automatically generated tests in 4 open-source PHP applications is investigated. Using the basic Tarantula technique, the programmer had to examine an average of 13.2% of an application's executed statements to find each of the 75 faults, when exploring the executed statements in order of decreasing suspiciousness. Using our best technique, which augments the domain of Tarantula for conditional and return value statements and uses the output mapping to fine-tune Tarantula's suspiciousness ratings, the programmer needs to explore only 2.2% of the executed statements, on average. More significantly, using our best technique, 87.7% of the 75 faults under consideration are localized to within 1% of all executed statements, which constitutes an almost five-fold improvement over the 17.8% for the basic Tarantula algorithm.

To summarize, the contributions of this invention include:
1. An approach for fault localization that uses combined concrete and symbolic execution to generate a suite of passing and failing tests. This overcomes the limitation of previous methods by not requiring the upfront availability of a test suite.
2. Automated techniques for fault localization, which were previously only evaluated on programs with artificially seeded faults, are demonstrated to be effective at localizing real faults in open-source PHP applications.
3. Six (6) fault localization techniques are presented that combine variations on the Tarantula algorithm with the use of an output mapping from statements to the fragments of program output that they produce, conditional modeling, and return value modeling.
4. The six (6) techniques are implemented in Apollo, an automated tool for detecting failures and localizing faults in PHP.
5. Apollo is used to localize 75 randomly selected faults in 4 PHP applications and compared the effectiveness of the 6 fault localization techniques. Our findings show that, using our best technique, 87.7% of the faults are localized to within 1% of all executed statements, which constitutes an almost five-fold improvement over the Tarantula algorithm.

2. PHP Web Applications

PHP is a widely used scripting language for implementing Web applications, in part due to its rich library support for network interaction, HTTP processing and database access. A typical PHP Web application is a client/server program in which data and control flow interactively between a server, which runs PHP scripts, and a client, which is a Web browser. The PHP scripts generate HTML code, which gets pushed to the client. Such code often includes forms that invoke other PHP scripts and pass them a combination of user input and constant values taken from the generated HTML.

2.1 The PHP Scripting Language

PHP is object-oriented, in the sense that it has classes, interfaces and dynamically dispatched methods with syntax and semantics similar to those of Java. PHP also has features of scripting languages, such as dynamic typing, and an eval construct that interprets and executes a string value that was computed at run-time as a code fragment. For example, the following code fragment:
  $code="$x=3;";$x=7;eval($code);echo$x;
prints the value 3. Other examples of the dynamic nature of PHP are the presence of the isset( ) function, which checks whether a variable has been defined, and the fact that statements defining classes and functions may occur anywhere.

The code in FIG. 1 illustrates the flavor of a PHP Web application and the difficulty in localizing faults. As can be seen, the code is an ad-hoc mixture of PHP statements and HTML fragments. The PHP code is delimited by <?php and ?> tokens. The use of HTML in the middle of PHP indicates that HTML is generated as if it occurred in a print statement. The require statements resemble the C #include directive by causing the inclusion of code from another source file. However, while #include in C is a preprocessor directive that assumes a constant argument, require in PHP is an ordinary statement in which the filename is computed at run time; for example, the arguments of the require statements in line 6 of the PHP script of FIG. 1(c) and in line 6 of the PHP script of FIG. 1(d) are dynamically computed at run time based on the output of the dirname function, which returns the directory component of a filename. Similarly, switch labels in PHP need not be constant but, unlike in other languages, can be dynamically determined at run time. This degree of flexibility is prized by PHP developers for enabling rapid application prototyping and development. However, the flexibility can make the overall structure of program hard to discern and render programs prone to code-quality problems that are difficult to localize.

2.2 Failures in PHP Programs

The present invention targets two types of failures that may occur during the execution of PHP Web applications and that can be automatically detected:

Execution Failures. These are caused by missing included files, incorrect SQL queries and uncaught exceptions. Such failures are easily identified since the PHP interpreter generates an error message and halts execution. Less serious execution failures, such as those caused by the use of deprecated language constructs, produce obtrusive error messages but do not halt execution.

HTML Failures. These involve situations in which generated HTML code is not syntactically correct, causing them to be rendered incorrectly in certain browsers. This may not only lead to portability problems, but also decrease performance since the resulting pages may render slower when browsers attempt to compensate for the malformed HTML code.

2.3 Fault Localization

Detecting failures only demonstrates that a fault exists; the next step is to find the location of the fault that causes each failure. There are at least two pieces of information that might help:

1. For HTML failures, HTML validators provide the problematic locations in the HTML code. Malformed HTML fragments can then be correlated with the portions of the PHP scripts that produced them.
2. For both kinds of failures, one could look at runs that do not exhibit the error, and record what set of statements such runs execute. Comparing that set of statements with the set of statements executed by the failing runs can then provide clues that can help localizing the fault. The extensive literature on fault localization algorithms that exploit such information is discussed in Section 7.

2.4 Motivating Example

FIG. 1 shows an example of a PHP application that is designed to illustrate the particular complexities of finding and localizing faults in PHP Web applications. The top-level index.php script in FIG. 1(a) contains static HTML code. The login.php script in FIG. 1(c) attempts to authenticate the user. The view.php script in FIG. 1(d) is for data display. The two PHP scripts login.php and view.php rely on a shared constants.php include file, shown in FIG. 1(b); this file defines some standard constants and an authentication function.

These fragments are part of the client/server work flow in a Web application: the user first sees the index.php page of FIG. 1(a) and enters the required credentials. The user-input credentials are processed by the login.php script in FIG. 1(c). This script generates a response page that allows the user to enter further input, causing further processing by the view.php script in FIG. 1(d). Note that the user name and password that are entered by the user during the execution of login.php are stored in special locations $_SESSION[$userTag] and $_SESSION[$pwTag], respectively. Moreover, if the user is the administrator, this fact is recorded in $_SESSION[$typeTag]. This illustrates how PHP handles session state, which is data that persists from one page to another to keep track of the interactions with the application by a particular user. Thus, the updates to _SESSION in FIG. 1(c) will be seen by the code in FIG. 1(d) when the user follows the link to view.php in the HTML page that is returned by login.php. The view.php script uses this session information in line 8 to verify the username and password provided by the user.

This sample program contains an error in the HTML code it produces: the H2 tag opened in line 18 of FIG. 1(d) is never closed. While this fault itself is trivial, localizing its cause is not. An ordinary tester would likely start executing this application by entering credentials into the script in FIG. 1(c). The tester must then discover that setting $user to the value admin results in the selection of a different branch that records the user type $typeTag as admin in the session state, as shown in lines 21-23 of login.php. After that, the tester would have to enter a topic in the form generated by the login.php script, and would then proceed to execute the code in FIG. 1(d) with the appropriate session state, which will finally generate the HTML code exhibiting the fault, as shown in FIG. 2(a). Thus, finding the fault requires careful selection of inputs to a series of interactive scripts, and tracking updates to the session state during the execution of those scripts.

The next step is to determine the cause of the malformed HTML. Consider the two sources of information suggested in Section 2.3:

1. Our validator produces the output shown in FIG. 2(c) for this fault, indicating that lines 5 and 6 in the malformed HTML of FIG. 2(a) are associated with the HTML failure. These lines correspond to the H2 heading and the following /BODY tags, respectively. By correlating this information with the output mapping shown in FIG. 2(b), one skilled in the art can determine that lines 18 and 25 in view.php produced these lines of output.
2. The second source of information is obtained by comparing the statements executed in passing and failing runs. The HTML failure only occurs when the value of $type is admin. Thus, the difference between passing and failing runs consists of all code that is guarded by the two conditionals in lines 11 and 17 in view.php. One skilled in the art can conclude that the statements in lines 12, 14, 18 and 21 are suspect.

Neither of these estimates is precise, because the fault is clearly the omission of the printing of an /H2 tag in line 18. However, the results of the validator and the sets of statements executed in passing and failing runs can be combined. Specifically, one could observe that the printing of /BODY in line 25 in view.php occurs in both passing and failing executions, and is therefore unlikely to be the location of the fault. Furthermore, one can observe that lines 12 and 14, each of which is only executed in one of the executions, are not associated with the failure according to the information received from the oracle. Therefore, one can conclude that the fault is most closely associated with line 18 in view.php.

Another thing to observe about the PHP Web application in FIG. 1 is that the login.php script in FIG. 1(c) has an if statement in line 10 for which there is no matching else branch. This implies that the BODY tag is closed (in line 16) only if the authentication check of line 10 succeeds; if that check fails, the BODY tag will never be closed, giving rise to a malformed HTML page. This problem may not be discovered during testing, since it manifests itself only if invalid authentication credentials are provided. Furthermore, since the code that should close the BODY tag is missing, there is no line that is only executed by a failing run, and the Tarantula fault-localization technique will fail to pinpoint the exact program point responsible for the malformed HTML code. This invention introduces a novel condition-modeling technique to address such errors by omission. In Section 4.4, condition modeling is discussed and its applicability to the example of FIG. 1. This invention also introduces a novel return-value-modeling technique, which can further enhance the effectiveness of fault localization methods.

Note that, due to the necessarily small size of this example, the HTML errors it contains are localized and could likely be found with grep or a similar tool; however, in more complex applications, HTML errors is encountered that combine HTML generated by multiple statements that are not all in one place.

3. Combined Concrete And Symbolic Execution

In one embodiment, the technique in the present invention for finding failures in PHP applications is a variation on combined concrete and symbolic execution [9, 25, 5, 10, 28], a well-established test generation technique. This technique executes an application on some initial (e.g., empty or randomly-chosen) input, and then on additional inputs obtained by solving constraints derived from exercised control flow paths. Failures that occur during these executions are reported to the user.

In a previous paper [3], we described how this technique can be adapted to the domain of dynamic web applications written in PHP. Our Apollo tool takes into account language constructs that are specific to PHP, uses an oracle to validate the output, and supports database interaction. In [4], we extended the work to address interactive user input (described in Section 2): PHP applications typically generate HTML pages that contain user-interface features such as buttons that—when selected by the user—result in the execution of additional PHP scripts. Modeling such user input is important, because coverage of the application will typically remain very low otherwise. Apollo tracks the state of the environment, and automatically discovers additional scripts that the user may invoke based on an analysis of available user options. This is important because a script is much more likely to perform complex behavior when executed in the correct context (environment). For example, if a web application does not record in the environment that a user is logged in, most scripts will present only vanilla information and terminate quickly (e.g., when the condition in line 8 of FIG. 1(d) is false).

The inputs to Apollo's algorithm are: a program P composed of any number of executable components (PHP scripts), the initial state C of the environment before executing any component (e.g., database), a set of executable components reachable from the initial state C, and an output oracle O. The output of the algorithm is a set of bug reports B for the program P, according to O. Each bug report contains the identification information of the failure (message, and generating program part), and the set of tests exposing the failure.

The algorithm uses a queue of tests. The criteria of selecting tests from the queue prefers tests that will cover additional code. More details can be found in [4]. Each test is comprised of three components: (i) the program component to execute, (ii) a path constraint which is a conjunction of conditions on the program's input parameters, and (iii) the environment state before the execution. The queue is initialized with one test for each of the components executable from the initial state, and the empty path constraint. The algorithm then processes each element of this queue as follows:

1. Using a constraint solver to find a concrete input that satisfies a path constraint from the selected test.
2. Restoring the environment state, then executing the program component on the input and checking for failures. Detected failures are merged into the corresponding bug reports. The program is also executed symbolically on the same input. The result of symbolic execution is a path constraint, $\wedge_{i=1}^n c_i$, which is satisfied if the given path is executed (here, the path constraint reflects the path that was just executed).
3. Creating new test inputs by solving modified versions of the path constraint as follows: for each prefix of the path constraint, the algorithm negates the last conjunct. A solution, if it exists, to such an alternative path constraint corresponds to an input that will execute the program along a prefix of the original execution path, and then take the opposite branch.
4. Analyzing the output to find new transitions (referenced scripts, and parameter values) from the new environment state. Each transition is expressed as a pair of path constraints and an executable component.
5. Adding new tests for each transition not explored before.

For instance, an execution of login.php that did not define $user would generate a path constraint noting that $user is not set, i.e. ! isset ($user). A subsequent execution could be constructed by negating this constraint to isset ($user). An execution satisfying this new constraint will define $user to some value.

4. Fault Localization

In this section, the Tarantula fault-localization technique is reviewed. Next an alternative technique is presented that is based on the output mapping and positional information obtained from an oracle. Next, a technique is presented that combines the former with the latter. Finally, how the use of an extended domain for conditional expressions, and function call expression can help improve Tarantula's effectiveness is discussed.

4.1 Tarantula

Jones, et al. [15, 14] presented Tarantula, a fault-localization technique that associates with each statement a suspiciousness rating that indicates the likelihood for that statement to contribute to a failure. The suspiciousness rating $S_{tar}$ (l) for a statement that occurs at line[3] l is a number between 0 and 1, defined as follows (Line numbers are used to identify statements, which enables the presentation of different fault localization techniques in a uniform manner.):

$$S_{tar}(l) = \frac{\text{Failed}(l)/\text{TotalFailed}}{\text{Passed}(l)/\text{TotalPassed} + \text{Failed}(l)/\text{TotalFailed}}$$

where Passed (l) is the number of passing executions that execute statement l, Failed(l) is the number of failing executions that execute statement l, TotalPassed is the total number of passing test cases, and TotalFailed is the total number of failing test cases. After suspiciousness ratings have been computed, each of the executed statements is assigned a rank, in the order of decreasing suspiciousness. Ranks need not be unique: The rank of the statement l reflects the maximum number of statements that would have to be examined if statements are examined in order of decreasing suspiciousness, and if l were the last statement of that particular suspiciousness level chosen for examination.

Jones and Harrold [14] conducted a detailed empirical evaluation in which they apply Tarantula to faulty versions of the Siemens suite [12], and compare its effectiveness to that of several other fault-localization techniques (see Section 7). The Siemens suite consists of several versions of small C programs into which faults have been seeded artificially. Since the location of those faults is given, one can evaluate the effectiveness of a fault-localization technique by measuring its ability to identify those faults. In the fault-localization literature, this is customarily done by reporting the percentage of the program that needs to be examined by the programmer, assuming that statements are inspected in decreasing order of suspiciousness [7, 1, 23, 14].

More specifically, Jones and Harrold compute for each failing-test run a score (in the range of 0%-100%) that indicates the percentage of the application's executable statements that the programmer need not examine in order to find the fault. This score is computed by determining a set of examined statements that initially contains only the statement(s) at rank 1. Then, iteratively, statements at the next higher rank are added to this set until at leas one of the faulty statements is included. The score is now computed by dividing the number of statements in the set by the total number of executed statements. Using this approach, Jones and Harrold found that 13.9% of the failing-test runs were scored in the 99-100% range, meaning that for this percentage of the failing tests, the programmer needs to examine less than 1% of the program's executed statements to find the fault. They also report that for an additional 41.8% of the failing tests, the programmer needs to inspect less than 10% of the executed statements.

4.2 Fault Localization Using Output Mapping

An oracle that determines whether or not a failure occurs can often provide precise information about the parts of the output that are associated with that failure. For instance, given an HTML page, an HTML validator will typically report the locations in the corresponding HTML code where the code is syntactically incorrect. Such information can be used as a heuristic to localize faults in the program, provided that it is possible to determine which portions of the program produced the faulty portions of the output. The basic idea is that the code that produced the erroneous output is a good place to start looking for the causative fault. This is formalized as follows. Assume the following two functions:

O(f) returns output line numbers reported by the oracle O for failure f, and

P(o) returns the set of program parts of the source program responsible for output line o Given these two functions, a suspiciousness rating $S_{map}(l)$ of the statement at line l for failure f is defined as follows:

$$S_{map}(l) = \begin{cases} 1 & \text{if } l \in \bigcup_{o \in O(f)} P(o) \\ 0 & \text{otherwise} \end{cases}$$

Note that this is a binary rating: program parts are either highly suspicious or not suspicious at all.

This output mapping depends on an oracle that can provide a good mapping of an error to the location that generated it; the HTML validator is a good example of such an oracle, but, in general, not all errors will have such an oracle available. Thus, this approach is combined in the present invention with others to handle the full range of errors.

4.3 Output Mapping

A fault localization technique such as the Tarantula algorithm presented in Section 4.1 localizes failures based on how often statements are executed in failing and passing executions. However, in the Web-application domain, a significant number of lines are executed in both cases, or only in failing executions. The fault-localization technique presented in Section 4.2 can be used to enhance the Tarantula results by giving a higher rank to statements that are blamed by both Tarantula and the mapping technique. More formally, a new suspiciousness rating $S_{comb}(l)$ is defined for the statement at line l as follows:

$$S_{comb}(l) = \begin{cases} 1.1 & \text{if } S_{map}(l) = 1 \wedge S_{tar}(l) > 0.5 \\ S_{tar}(S) & \text{otherwise} \end{cases}$$

Informally, the suspiciousness rating 1.1 is given to any statement that is identified as highly suspicious by the oracle, and for which Tarantula indicates that the given line is positively correlated with the fault (indicated by a Tarantula suspiciousness rating greater than 0.5).

Example

As described in Section 2.4, the test input generation algorithm produces two runs of the script in FIG. 1(d): one that exposes an HTML error and one that does not. Table I shows the suspiciousness ratings $S_{tar}(l)$, $S_{map}(l)$, and $S_{comb}(l)$ that are computed for each line l in the PHP script in FIG. 1(d), according to the three fault localization techniques under consideration.

To understand how the Tarantula ratings are computed, consider statements that are only executed in the passing run. Such statements obtain a suspiciousness rating of 0/(1+0)=0.0. By similar reasoning, statements that are only executed in the failing run obtain a suspiciousness rating of 1/(0+1)=1.0, and statements that are executed in all the passing and the failing run obtain a suspiciousness rating of 1/(1+1)=0.5.

The suspiciousness ratings computed by the mapping-based technique can be understood by examining the output of the validator in FIG. 2(c), along with the HTML in FIG. 2(a) and the mapping from lines of HTML to the lines of PHP that produced them in FIG. 2(b). The validator says the error is in line 5 or 6 of the output, and those were produced by lines 18 and 25 in the script of FIG. 1(d). Consequently, the suspiciousness ratings for lines 18 and 25 are 1.0, and all other lines are rated 0.0 by the mapping based technique. The suspiciousness ratings for the combined technique follow directly from its definition in Section 4.3.

As can be seen from the table, the Tarantula technique identifies lines 12 and 18 as the most suspicious ones, and the output mapping based technique identifies lines 18 and 25 as such. In other words, each of these fault localization techniques—when used in isolation—reports one non-faulty statement as being highly suspicious. However, the combined technique correctly identifies only line 18 as the faulty statement.

4.4 Condition Modeling

Referring to Section 4.1, the Tarantula algorithm works by associating a suspiciousness rating with each statement present in the program under analysis. Sometimes, however, it is the absence of a statement that causes a failure. For example, a switch statement in which the default case is omitted can cause a failure if the missing default case was supposed to close certain HTML tags. Similarly, an if statement for which the matching else branch is missing can cause the resulting HTML code to be malformed if the Boolean predicate in the if statement is false, as discussed in Section 2.4 when discussing the if statement in line 10 of the login.php script. The Tarantula fault-localization technique, as previously applied to statements, cannot rank a missing statement since that will never be executed.

The present invention enhances Tarantula's effectiveness by employing a new condition-modeling technique. This new technique uses an augmented domain for modeling conditional statements: instead of assigning a suspiciousness rating and rank to a conditional statement itself, it assigns a rating and rank to pairs of the form (statement, index of first true case).

The number of pairs associated with a switch statement is equal to the number of cases in the statement plus 1. For example, if a switch statement s has three case predicates, then the pairs considered by the condition-modeling technique are as follows:

1. (s, 0), modeling the fact that all case predicates evaluate to false, causing the default branch—if it exists—to be executed
2. (s, 3), modeling the fact that both the first and second case predicates evaluate to false, and the third one to true 3. (s, 2), modeling the fact that the first case predicate evaluates to false and the second one to true
4. (s, 1), modeling the fact that the first case predicate evaluates to true If s is an if statement, there are two pairs associated with s:
1. (s, 0), modeling the fact that the predicate evaluates to false
2. (s, 1), modeling the fact that the predicate evaluates to true After computing suspiciousness ratings for all pairs (s, . . . ), the conditional statement s is assigned the maximum of these ratings, from which its rank is computed in the normal manner. This technique allows us to rank a switch statement with a missing default case and an if statement with a missing else branch, as explained in the following example.

Example

In the login.php script of FIG. 1(c), if s is the if statement in line 10, then (s, 1) is going to be assigned rank 0 because when its predicate is true, s is never going to participate in a faulty execution. On the other hand, (s, 0) is assigned rank 1 because executing s with its predicate set to false leads to a faulty execution, as discussed in Section 2.4. Our enhancement of Tarantula with condition modeling will assign to s the higher of the two ranks, 1. This is in contrast to the rank 0.5 that the statement-based Tarantula algorithm would have assigned to s.

4.5 Return Value Modeling

In addition to the condition modeling technique that was described above, the invention can be extended with a similar return value modeling technique. Here, the idea is that function call statements and/or method call statements are modeled as a pair (f, val), where val is an abstract representation of the return value of function f. The model we use allows the fault localization technique to further differentiate between the suspiciousness ratings of call statements by distinguishing between null and non-null values, zero and non-zero int and double values, true and false boolean values, constant and non-constant values, as well as empty and non-empty arrays, strings, and resources.

4.6 Overall Flow Diagram

Figure 9:
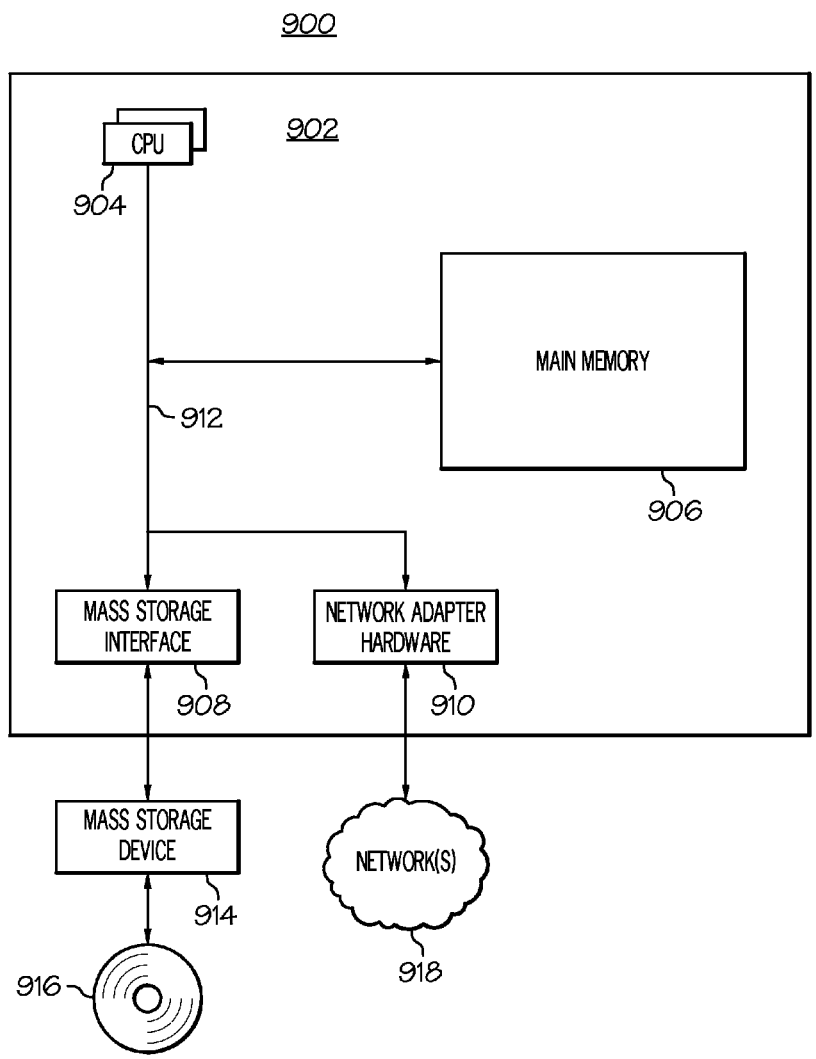
FIG. 9 is a block diagram of a computer system useful for implementing the software steps of the present invention.

Referring now to FIG. 3, the flowchart, and FIG. 9, the block diagram, illustrating an example architecture, functionality, and operation of possible implementations of systems, on-demand processes, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 3 is a flow diagram of the localization of faults in a software application using conditional and return value modeling. The flow begins in step 302 and immediately proceeds to step 304 where a set of one or more tests is received to apply to software application or at least a portion of a software application. Next in step 306, one or more domain elements are associated with the portion of the software. Here, domain elements are associated with statements in one of three possible ways: (i) if a statement s is a conditional statement with n branches $b_1, \ldots, b_n$, then we associate domain elements (s, $b_1$), . . . , (s, $b_n$) with each of the branches of that conditional statement, (ii) if a statement s is a call to a method or function f, and if $val_1, \ldots, val_n$ abstractly represent f's possible return values, then we associate domain elements elements (s, $val_1$), . . . , (s, $val_n$) with statement s, and (iii) for each statement s that is neither a conditional statement nor a function or method call, the domain element for that statement consists of the statement s itself.

In step 308, a statistical fault localization technique that uses the set of tests to localize at least one fault in the domain elements is received. Next a loop is entered for steps 310-316 for each of the tests in the set of tests. In the loop, each test in the set of tests is executed on the portion of the software application. A set of test information is recorded for each executed test in steps 312-316. The set of test information recorded can include a pass outcome; a fail outcome; and an exception outcome. The steps 312-316 in the loop include: step 312, a test outcome on whether a specific fault has occurred; step 314, one or more executed statements in the portion of the software application, and step 316 an abstract value for each executed statement in the portion of the software application that indicates a logical statement to which it corresponds. In one embodiment, the abstract model can include a result for each execution of the function calls. In another embodiment, the executed statements in the portion of the software application includes one or more function calls, branches, statements, and functions.

After all the tests in the set of test have been executed, the loop stops and in step 318 using the statistical fault localization technique which has been received, calculating a suspiciousness rating for each of the domain elements based on the set of test information which has been recorded the process ends in step 320. The method would typically report the list of suspiciousness rating for each domain element. In one embodiment, the list of suspiciousness rating is reported in a decreasing order of suspiciousness.

5. Implementation

In Apollo [4], a shadow interpreter is implemented based on the Zend PHP interpreter 5.2.2 (see http://www.php.net/) that simultaneously performs concrete program execution using concrete values, and a symbolic execution that uses symbolic values that are associated with variables. The following extensions are implemented to the shadow interpreter to support fault localization:

Statement Coverage. We extend fault localization techniques based on the percentage of failing and passing tests executing a given statement to calculate the statement's suspiciousness score. Our shadow interpreter records the set of executed statements for each execution by hooking into the zend_execute and compile_file methods.

HTML Validator. Apollo has been configured to use one of the following HTML validators as an oracle for checking HTML output: the Web Design Group (WDG) HTML validator and the CSE HTML Validator V9.06 (see http://htmlhelp.com/tools/validator/ and http://www.htmlvalidator.com).

Output Mapping. The output mapping technique, described in Section 4.2, localizes a fault found in the output to the statements producing the erroneous output part. Our shadow interpreter creates the mapping by recording the line number of the originating PHP statement whenever output is written out using the echo and print statements. The producing statement is found in the map using the positional information reported by an oracle when checking the output for faults.

Condition Modeling. Our shadow interpreter records the results of all comparisons in the executed PHP script for the conditional modeling technique, as described in Section 4.4. For each comparison, it records a pair consisting of the statement's line number and the relevant Boolean result. The only exception is the execution of a switch statement. For this, the shadow interpreter stores the set of results for all executed case blocks together with the switch line number.

Return Value Modeling. Our shadow interpreter records an abstracted result of each function call in the executed PHP script for the return value modeling technique, as described in Section 4.5.

6. Evaluation

This evaluation aims to answer two questions:

Q1. How effective is the Tarantula [14] fault localization technique in the domain of PHP web applications?

Q2. How effective is Tarantula, when combined with the use of an output mapping and/or when modeling the outcome of conditional expressions, as presented in Section 4?

6.1 Subject Programs

For the evaluation, 4 open-source PHP programs are selected (see http://sourceforge.net):

faqforge is a tool for creating and managing documents.

webchess is an online chess game.

schoolmate is a PHP/MySQL solution for administering elementary, middle, and high schools.

timeclock is a web-based timeclock system.

FIG. 5 is a table of characteristics of subject programs. The #files column lists the number of .php and .inc files in the program. The PHP LOC column lists the number of lines that contain executable PHP code. The #downloads column lists the number of downloads from http://sourceforge.net.

6.2 Methodology

In order to answer our research questions, a set of localized faults, and a test suite exposing them is needed for each subject program. Since neither a test suite nor a set of known faults exists for the subject programs, Apollo's combined concrete and symbolic execution technique that was presented in Section 3 is used to generate a test suite, and to detect failures. For this initial experiment, the test generator was given a time budget of 20 minutes, and during this time hundreds of tests were generated and many failures were found for each subject program.

In order to investigate the effectiveness of an automatic fault localization technique such as Tarantula, it is necessary to know where faults are located. Unlike previous research on automated fault localization techniques [15, 14, 24], where the location of faults was known (e.g., because faults were seeded), the location of the faults were not known, and therefore needed to localize them manually. Manually localizing and fixing faults is a very time-consuming task, so for this implementation 20 faults were used in each of the subject programs. The number of faults used however does not limit the true scope and spirit of the present invention. In webchess, only 15 faults were found to cause the 35 failures, so we used a total of 75 faults as the basis for the experiments discussed in this section. For each fault, a patch was devised and ensured that applying this patch fixed the problem, by running the tests again, and making sure that the associated failures did not recur. In general, a single fault may be responsible for multiple failures. FIG. 6 is a table that summarizes the details of the generated test suites, and the localized faults used in the remainder of this section. Referring to FIG. 6, shown are characteristics of the test suites, failures and localized faults in the subject programs. The columns of the table indicate: (i) the subject program, (ii) the number of tests in the test suite generated for that program, (iii) the number of failures exposed by the test suite (three columns: HTML failures, execution errors, total), and (iv) the number of faults manually localized for that program (three columns: HTML faults, execution faults, total).

The following fault localization techniques is used to assign suspiciousness ratings to all executed statements:

T The Tarantula algorithm that was presented in Section 4.1

O The technique of Section 4.2 based on using an output mapping in combination with positional information obtained from an oracle (HTML validator).

T+O The combined technique described in Section 4.3 that combines Tarantula with the use of the output mapping.

T C The variation on Tarantula presented in Section 4.4 in which conditional expressions are modeled as (condition, value) pairs.

T C+O The variation on Tarantula presented in Section 4.4, combined with the use of the output mapping.

T C or O A combined fault localization technique that uses T C for execution errors, and O for HTML failures.

The suspiciousness ratings are computed separately for each localized fault, by applying each of these fault localization techniques to a test suite that comprised the set of failing tests associated with the fault under consideration, and the set of all passing tests.

Similar to previous fault-localization studies [15, 7, 14, 24], the effectiveness of a fault localization algorithm is measured as the minimal number of statements that needs to be inspected until the first faulty line is detected, assuming that statements are examined in order of decreasing suspiciousness.

6.3 Results

FIG. 7 illustrates the experimental results for each of the six techniques (T, O, T+O, T C, T C+O and T C or O) discussed above. Turning now to FIG. 7, shown is a table of results of fault localization using the different fault localization techniques. The columns of the table indicate (i) the subject program, (ii) the fault localization technique used (iii) the average number of statements to inspect, and average percentage of statements to inspect, (iv)-(xiv) indicate the percentage of faults in each range of percentage of statements to inspect. The table in FIG. 7 shows, for each subject program (and for the subject programs in aggregate) a group of six rows of data, one for each technique. Each row shows, from left to right, the average number (percentage) of statements that needs to be explored to find each fault, followed by 11 columns of data that show how many of the faults were localized by exploring up to 1% of all statements, up to 10% of all statements, up to 20% of all statements, and so on. Consider, for example, the case where the T+O technique is used to localize faults in faqforge. If a programmer inspects the statements reported by this technique in decreasing order of suspiciousness, then on average, he will need to inspect 9.3 statements until he has found the first faulty statement, and this corresponds to 1.3% of the executed statements. Furthermore, one can see that for 85% of the faults in faqforge, less than 1% of the executed statements needs to be inspected, for an additional 10% of the faults, between 1% and 10% of the executed statements needs to be inspected, and that the remaining 5% of the faults requires inspecting between 10% of 20% of the executed statements.

In order to ease the discussion of the relative effectiveness of the techniques, we will say that a fault is well-localized by a fault localization technique if inspecting the statements in decreasing order of suspiciousness according to that technique implies that all faulty statements are found after inspecting less than 1% of all executed statements. Using this terminology, we can see that:

- Using the basic Tarantula algorithm, only 17.8% of all faults are well-localized, on average (see the first row of data in the set of rows labeled aggregated).
- Using the oracle-based technique O, 75.3% of all faults are well-localized, on average over all subjects.
- Combining Tarantula with the oracle (T+O) yields a technique that outperforms either of its constituents, with 82.2% of all faults being well-localized on average.
- Adapting Tarantula to operate on statements and (condition, value) pairs (T C) is slightly helpful, by well-localizing 20.5% of all faults, versus the previously mentioned 17.8% for the statement-based Tarantula-algorithm.
- The most effective fault localization technique is obtained by using the variant of Tarantula that operates on statements and (condition, value) pairs, in combination with the oracle (T C+O). Using this technique, 87.7% of all faults are well-localized, on average over all subjects.
- For the combined technique that uses the T C technique for execution errors and the O technique for HTML failures, 74.0% of all faults are well-localized.

6.4 Discussion

While only aggregated data has been discussed so far, the results appear to be consistent across the four subject applications. It is interesting to note that the effectiveness of the more precise modeling of conditionals depends on whether the subject program contains any faults that consist of missing branches in conditions. For one subject (webchess) this accounts for a 15.4% improvement in well-localized faults over the basic Tarantula algorithm, whereas for another (timeclock), it makes no difference at all. In summary, it has been shown that the T C+O yields an almost five-fold increase in the percentage of well-localized bugs, when compared with the basic Tarantula algorithm. Most of this increment is due to the use of the output mapping in combination with positional information obtained from the oracle. This is undoubtedly due to the fact that many of the localized faults manifest themselves via malformed HTML output. Our treatment of conditional expressions accounts for a much smaller part of the gains in precision, but is still helpful in cases where the fault consists of a missing branch in a conditional statement.

It is interesting to note that, since the oracle provides a binary suspiciousness rating, it tends to either be very helpful, or not helpful at all. This argues strongly for a fault-localization method that combines a statistical method such as Tarantula, with one based on an output mapping. One could consider using different techniques for different kinds of faults (e.g., use Tarantula for execution errors, and the oracle-based technique for HTML errors). However, the example that was discussed previously in Section 2.4 shows that the two techniques can reinforce each other in useful ways. This is confirmed by our experimental results: the combined technique T C or O is significantly less effective (74.0% of all statements being well-localized) than the combined technique T C+O (87.7%).

Figure 8:
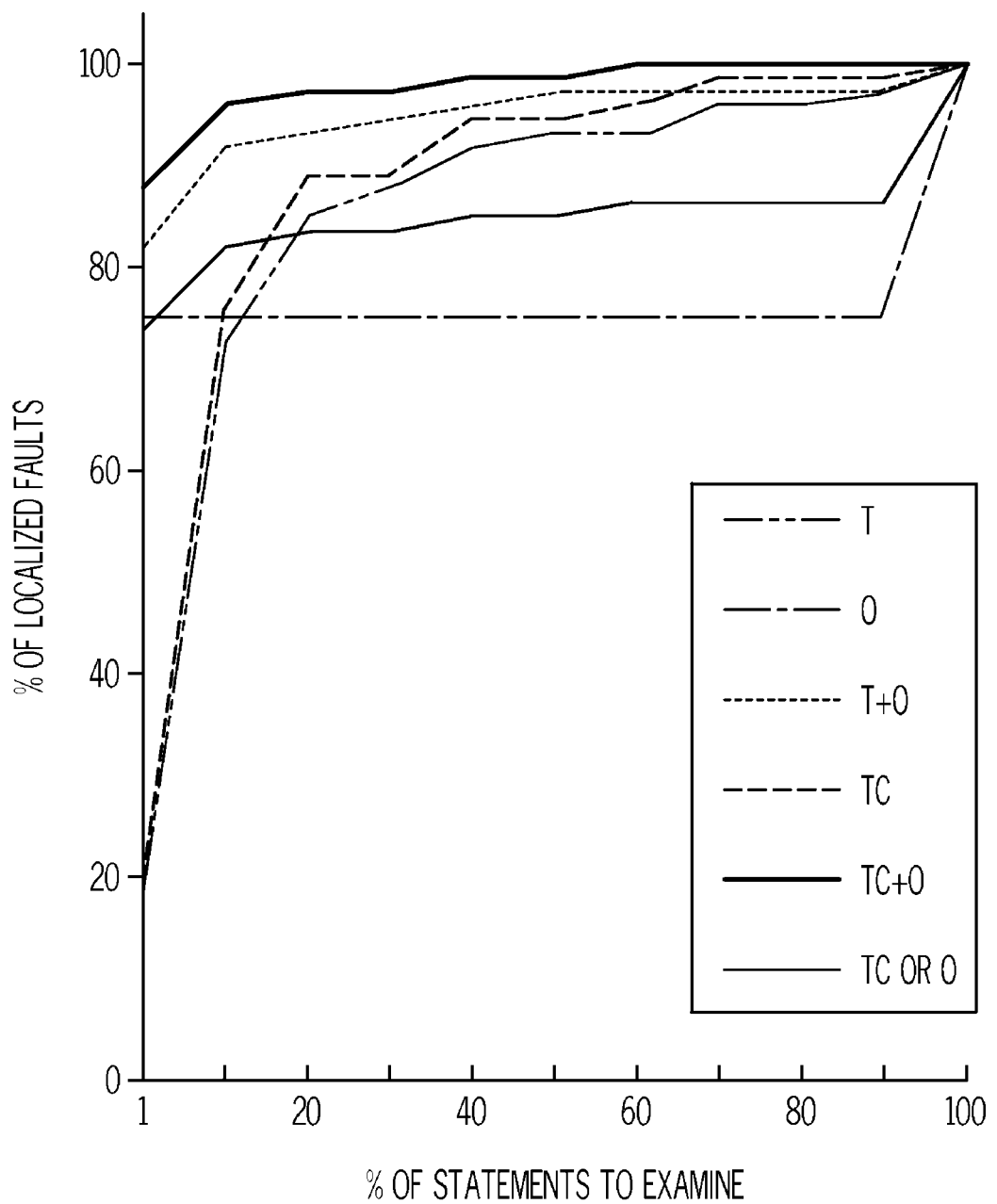
FIG. 8 is a graph of effectiveness comparison of different fault localization techniques.

FIG. 8 shows a graph depicting the aggregated data of table in FIG. 7. The X-axis represents the percentage of statements that need to be examined in decreasing order of suspiciousness until the first fault has been found, and the Y-axis the number of faults localized. A line is drawn for each of the six fault localization techniques under consideration. From these lines, it is clear that the T C+O technique outperforms all other techniques. In particular, note that, for any percentage n between 0% and 100%, T C+O localizes more faults than any of the other algorithms when up to n % of all statements are examined in decreasing order of suspiciousness.

7. Conclusions

The present invention leverages combined concrete and symbolic execution and several fault-localization techniques to create a uniquely powerful tool that automatically detects failures and localizes faults in PHP Web applications. The fault-localization techniques evaluated combine variations on the Tarantula algorithm with a technique based on maintaining a mapping between executed statements and the fragments of output they produce, mapping of conditional results, and function call results. These techniques have been implemented in a tool called Apollo, and evaluated them by localizing 75 randomly selected faults that were exposed by automatically generated tests in four PHP applications. Our findings indicate that, using our best technique, 87.7% of the faults under consideration are localized to within 1% of all executed statements, which constitutes an almost five-fold improvement over the Tarantula algorithm.

8. On Demand Deployment

The fault localization using directed test generation application process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

9. Non-Limiting Hardware Embodiments

FIG. 9 is a block diagram of a computer system useful for implementing the software steps of the present invention.

FIG. 9 is a block diagram illustrating a more detailed view of a computer system or information processing system 900, useful for implementing the fault localization using conditional and return value modeling of FIG. 9. The information processing system 900 is based upon a suitably configured processing system adapted to implement one or more embodiments of the present invention. Similarly, any suitably configured processing system can be used as the information processing system 900 by embodiments of the present invention.

The information processing system 900 includes a computer 902. The computer 902 has a processor(s) 904 that is connected to a main memory 906, mass storage interface 908, and network adapter hardware 910 coupled to network 918. A system bus 912 interconnects these system components. The main memory 906, in one embodiment, comprises the fault localization using directed test generation application of FIG. 2. (or at least a portion discussed above.

Although illustrated as concurrently resident in the main memory 906, it is clear that respective components of the main memory 906 are not required to be completely resident in the main memory 906 at all times or even at the same time. In one embodiment, the information processing system 900 utilizes conventional virtual addressing mechanisms to allow programs to behave as if they have access to a large, single storage entity, referred to herein as a computer system memory, instead of access to multiple, smaller storage entities such as the main memory 906 and data storage device 916. Note that the term "computer system memory" is used herein to generically refer to the entire virtual memory of the information processing system 906.

The mass storage interface 908 is used to connect mass storage devices, such as mass storage device 914, to the information processing system 900. One specific type of data storage device is an optical drive such as a CD/DVD drive, which may be used to store data to and read data from a computer readable medium or storage product such as (but not limited to) a CD/DVD 916. Another type of data storage device is a data storage device configured to support, for example, NTFS type file system operations.

Although only one CPU 904 is illustrated for computer 902, computer systems with multiple CPUs can be used equally effectively. Embodiments of the present invention further incorporate interfaces that each includes separate, fully programmed microprocessors that are used to off-load processing from the CPU 904. An operating system (not shown) included in the main memory is a suitable multitasking operating system such as any of the Linux, UNIX, Windows, and Windows Server based operating systems. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 900. The network adapter hardware 910 is used to provide an interface to a network 934. Embodiments of the present invention are able to be adapted to work with any data communications connections including present day analog and/or digital techniques or via a future networking mechanism.

Although the exemplary embodiments of the present invention are described in the context of a fully functional computer system, those of ordinary skill in the art will appreciate that various embodiments are capable of being distributed as a program product via CD or DVD, e.g. CD 916, CD ROM, or other form of recordable media, or via any type of electronic transmission mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

10. References

Each of the following thirty-two references are hereby incorporated by reference in their entirety.

[1] R. Abreu, P. Zoeteweij, and A. J. C. van Gemund. An evaluation of similarity coefficients for software fault localization. In PRDC 2006, pages 39-46, 2006.

[2] H. Agrawal, J. R. Horgan, S. London, and W. E. Wong. Fault localizatin using execution slices and dataflow tests. In ISSRE, Toulouse, France, 1995.

[3] S. Artzi, A. Kie˘zun, J. Dolby, F. Tip, D. Dig, A. Paradkar, and M. D. Ernst. Finding bugs in dynamic web applications. In ISSTA, pages 261-272, 2008.

[4] S. Artzi, A. Kie˘zun, J. Dolby, F. Tip, D. Dig, A. Paradkar, and M. D. Ernst. Finding bugs in web applications using dynamic test generation and explicate model checking. IEEE Transactions on Software Engineering, 2010. To appear. XXX C. Cadar, V. Ganesh, P. M. Pawlowski, D. L. Dill, and D. R. Engler. EXE: automatically generating inputs of death. In CCS, 2006.

[6] T. M. Chilimbi, B. Liblit, K. K. Mehra, A. V. Nori, and K. Vaswani. Holmes: Effective statistical debugging via efficient path profiling. In ICSE, 2009.

[7] H. Cleve and A. Zeller. Locating causes of program failures. In ICSE, pages 342-351, May 2005.

[8] V. Dallmeier, C. Lindig, and A. Zeller. Lightweight defect localization for java. In ECOOP, pages 528-550, 2005.

[9] P. Godefroid, N. Klarlund, and K. Sen. DART: Directed automated random testing. In PLDI, 2005.

[10] P. Godefroid, M. Y. Levin, and D. Molnar. Automated whitebox fuzz testing. In NDSS, 2008.

[11] S. Horwitz, T. Reps, and D. Binkley. Interprocedural slicing using dependence graphs. ACM Trans. Program. Lang. Syst., 12(1):26-60, 1990.

[12] M. Hutchins, H. Foster, T. Goradia, and T. Ostrand. Experiments of the effectiveness of dataflow- and control flow-based test adequacy criteria. In ICSE, pages 191-200, 1994.

[13] D. Jeffrey, N. Gupta, and R. Gupta. Fault localization using value replacement. In ISSTA, pages 167-178, 2008.

[14] J. A. Jones and M. J. Harrold. Empirical evaluation of the Tarantula automatic fault-localization technique. In ASE, pages 273-282, 2005.

[15] J. A. Jones, M. J. Harrold, and J. Stasko. Visualization of test information to assist fault localization. In ICSE, pages 467-477, 2002.

[16] B. Liblit, A. Aiken, A. X. Zheng, and M. I. Jordan. Bug isolation via remote program sampling. In PLDI, pages 141-154, 2003.

[17] B. Liblit, M. Naik, A. X. Zheng, A. Aiken, and M. I. Jordan. Scalable statistical bug isolation. In PLDI'05, pages 15-26, 2005.

[18] C. Liu, X. Yan, L. Fei, J. Han, and S. P. Midkiff. Sober: statistical model-based bug localization. In FSE, pages 286-295, 2005.

[19] J. Lyle and M. Weiser. Automatic bug location by program slicing. In ICCEA, pages 877-883, Beijing (Peking), China, 1987.

[20] Y. Minamide. Static approximation of dynamically generated Web pages. In WWW, 2005.

[21] H. Pan and E. H. Spafford. Heuristics for automatic localization of software faults. Technical Report SERC-TR-116-P, Purdue University, July 1992.

[22] X. Ren and B. G. Ryder. Heuristic ranking of java program edits for fault localization. In ISSTA, pages 239-249, 2007.

[23] M. Renieris and S. P. Reiss. Fault localization with nearest neighbor queries. In ASE, pages 30-39, 2003.

[24] R. Santelices, J. A. Jones, Y. Yu, and M. J. Harrold. Lightweight fault-localization using multiple coverage types. In ICSE, pages 56-66, 2009.

[25] K. Sen, D. Marinov, and G. Agha. CUTE: A concolic unit testing engine for C. In FSE, 2005.

[26] M. Stoerzer, B. G. Ryder, X. Ren, and F. Tip. Finding Failure-inducing Changes in Java Programs Using Change Classification. In FSE, pages 57-68, Portland, [0056] OR, USA, Nov. 7-9, 2006.

[27] F. Tip. A survey of program slicing techniques. Journal of Programming Languages, 3(3):121-189, 1995.

[28] G. Wassermann, D. Yu, A. Chander, D. Dhurjati, H. Inamura, and Z. Su. Dynamic test input generation for web applications. In ISSTA, 2008.

[29] C. Yilmaz, A. M. Paradkar, and C. Williams. Time will tell: fault localization using time spectra. In ICSE, pages 81-90, 2008.

[30] A. Zeller. Isolating cause-effect chains from computer programs. In FSE, pages 1-10. ACM Press, November 2002.

[31] X. Zhang, N. Gupta, and R. Gupta. Locating faults through automated predicate switching. In ICSE, pages 272-281, 2006.

[32] Z. Zhang, W. K. Chan, T. H. Tse, B. Jiang, and X. Wang. Capturing propagation of infected program states. In ESEC/FSE, pages 43-52, 2009.

What is claimed is:

1. A computer-implemented method to localize faults in a software application, the computer-implemented method comprising:

receiving a set of tests to apply on a software application, wherein the software includes both unknown fault paths and known fault paths;

associating one or more domain elements with the software;

receiving a statistical fault localization technique that uses the set of tests to localize at least one fault in the domain elements based on those domain elements appearing in passing and failing tests;

executing each test in the set of tests on the software application, and recording, for each executed test, a set of test information including:

a test outcome on whether a specific fault has occurred, wherein a passing test is the test outcome with no fault that has occurred, and a failing test is the test outcome with a fault that has occurred;

one or more executed statements in the software application, and for each execution of each executed statement in the software application, compute an abstract value based on its runtime behavior that indicates a domain element to which that statement execution corresponds;

using the statistical fault localization technique which has been received, calculating a suspiciousness rating for each of the domain elements based on the set of test information which has been recorded, wherein the suspiciousness rating is computed for each executed domain element as a percentage of passing and failing tests that execute that domain element; and reporting a list containing a suspiciousness rating for each domain element in one of a decreasing order of suspiciousness rating and an increasing order of suspiciousness rating.

2. The computer implemented method of claim 1, wherein the domain element is at least one of:

a pair comprising of a conditional statement and a value that identifies a branch of that conditional statement; and an unconditional statement.

3. The computer implemented method of claim 1, wherein the domain element is at least one of:

a pair comprising of a call to a function, and an abstract representation of a return value of that function; and a statement other than a function call.

4. The computer implemented method of claim 1, wherein the executed statements in the software application includes one or more function calls and wherein the executing each test in the set of tests, and recording the set of test information further includes recording:

an abstract model of a result for each execution of the function calls.

5. The computer implemented method of claim 1, wherein the executed statements in the software application includes one or more of branches, statements, and functions.

6. The computer implemented method of claim 1, wherein the executing each test in set of tests, and recording the set of test information further includes recording one of:
- a pass outcome;
- a fail outcome; and
- an exception outcome.

7. The computer implemented method of claim 2, wherein the conditional statement is one of:
- a while statement;
- an if statement; and
- a switch statement.

8. A computer program product for analyzing an application comprising a plurality of code fragments, the computer program product comprising:
- a non-transitory storage medium readable by a computer system, the non-transitory storage medium storing software programming instructions capable of performing with a processor programming code to carry out:
  - receiving a set of tests to apply on a software application, wherein the software includes both unknown fault paths and known fault paths;
  - associating one or more domain elements with the software;
  - receiving a statistical fault localization technique that uses the set of tests to localize at least one fault in the domain elements based on those domain elements appearing in passing and failing tests;
  - executing each test in the set of tests on the software application, and recording, for each executed test, a set of test information including:
    - a test outcome on whether a specific fault has occurred,
    - one or more executed statements in the software application, and
    - for each execution of each executed statement in the software application, compute an abstract value based on its runtime behavior that indicates a domain element to which that statement execution corresponds;
  - using the statistical fault localization technique which has been received, calculating a suspiciousness rating for each of the domain elements based on the set of test information which has been recorded, wherein the suspiciousness rating is computed for each executed domain element as a percentage of passing and failing tests that execute that domain element; and
  - reporting a list containing a suspiciousness rating for each domain element in one of a decreasing order of suspiciousness rating and an increasing order of suspiciousness rating.

9. The computer program product of claim 8, wherein the domain element is at least one of:
- a pair comprising of a conditional statement and a value that identifies a branch of that conditional statement; and
- an unconditional statement.

10. The computer program product of claim 8, wherein the domain element is at least one of:
- a pair comprising of a call to a function, and an abstract representation of a return value of that function; and
- a statement other than a function call.

11. The computer program product of claim 8, wherein the executed statements in the software application includes one or more function calls and wherein the executing each test in the set of tests, and recording the set of test information further includes recording:
- an abstract model of a result for each execution of the function calls.

12. The computer program product of claim 8, wherein the executed statements in the software application includes one or more of branches, statements, and functions.

13. The computer program product of claim 8, wherein the executing each test in set of tests, and recording the set of test information further includes recording one of:
- a pass outcome;
- a fail outcome; and
- an exception outcome.

14. The computer program product of claim 9, wherein the conditional statement is one of:
- a while statement;
- an if statement; and
- a switch statement.

15. A system for analyzing an application comprising a plurality of code fragments, the system comprising:
- a computer memory capable of storing machine instructions; and
- a processor in communication with said computer memory, said processor capable of accessing said machine instructions to perform:
  - receiving a set of tests to apply on a software application, wherein the software includes both unknown fault paths and known fault paths;
  - associating one or more domain elements with the software;
  - receiving a statistical fault localization technique that uses the set of tests to localize at least one fault in the domain elements based on those domain elements appearing in passing and failing tests;
  - executing each test in the set of tests on the software application, and recording, for each executed test, a set of test information including:
    - a test outcome on whether a specific fault has occurred,
    - one or more executed statements in the software application, and
    - for each execution of each executed statement in the software application, compute an abstract value based on its runtime behavior that indicates a domain element to which that statement execution corresponds;
  - using the statistical fault localization technique which has been received, calculating a suspiciousness rating for each of the domain elements based on the set of test information which has been recorded, wherein the suspiciousness rating is computed for each executed domain element as a percentage of passing and failing tests that execute that domain element; and
  - reporting a list containing a suspiciousness rating for each domain element in one of a decreasing order of suspiciousness rating and an increasing order of suspiciousness rating.

16. The system of claim 15, wherein the domain element is at least one of:
- a pair comprising of a conditional statement and a value that identifies a branch of that conditional statement; and
- an unconditional statement.

* * * * *